(12) United States Patent
Norton et al.

(10) Patent No.: US 6,247,601 B1
(45) Date of Patent: Jun. 19, 2001

(54) GLASS PANE HANDLING ASSEMBLY

(75) Inventors: Matthew A. Norton, Wichita; Monte R. Berger, Udall; Rod W. Henricks, Wichita, all of KS (US)

(73) Assignee: Unruh Fab, Inc., Sedgwick, KS (US)

( * ) Notice: Subject to any disclaimer, the term of this patent is extended or adjusted under 35 U.S.C. 154(b) by 0 days.

(21) Appl. No.: 09/466,145

(22) Filed: Dec. 17, 1999

(51) Int. Cl.$^7$ .................................................. A47G 19/08
(52) U.S. Cl. ............................................................ 211/41.14
(58) Field of Search ............................. 211/41.14, 151; 280/46; 206/448

(56) References Cited

U.S. PATENT DOCUMENTS

| | | |
|---|---|---|
| 2,946,453 | 7/1960 | Pityo .................................. 211/41.14 |
| 3,884,778 | 5/1975 | Eng et al. ............................ 21/41.14 |
| 4,033,597 | 7/1977 | Boyer ................................. 211/41.14 |
| 4,093,251 | 6/1978 | Boyer ................................. 211/41.14 |
| 4,202,452 | 5/1980 | McCormick ....................... 211/41.14 |
| 4,489,835 | 12/1984 | Tombal et al. ..................... 211/41.14 |
| 4,778,064 | 10/1988 | Gold ................................... 211/41.14 |
| 4,899,891 | 2/1990 | Sipila et al. ....................... 211/41.14 |
| 5,465,883 | 11/1995 | Woodward ......................... 211/41.14 |
| 5,906,282 | 5/1999 | Aldrich et al. .................... 211/41.14 |

*Primary Examiner*—Alvin Chin-Shue
*Assistant Examiner*—Sarah Purol
(74) *Attorney, Agent, or Firm*—Kenneth H. Jack; Davis & Jack, L.L.C.

(57) ABSTRACT

An assembly for storing and handling of glass panes consisting a glass rack support frame adapted for attachment to an above floor or ground level surface, such frame defining a rearwardly opening glass rack receiving space; a glass rack; wheels and roller tracks rollably mounting the glass rack upon the glass rack support frame, and allowing alternate forward and rearward motion of the glass rack into and out of the glass rack receiving space; a roll stop having a rack engagement surface and a cart engagement surface; and a hinge for movably mounting the roll stop upon the glass rack support frame, the hinge interconnecting the roll stop and glass rack support frame for motion between first and second positions, the rack engaging surface of the roll stop facing forwardly while the roll stop occupies its first position, the roll stop moving away from the first position toward the second position upon application of pressure to its cart engaging surface.

17 Claims, 4 Drawing Sheets

GLASS PANE HANDLING ASSEMBLY

FIELD OF THE INVENTION

This invention relates to apparatus and assemblies for storing, transferring, and transporting automobile windshield and window covering panes of glass.

BACKGROUND OF THE INVENTION

Rollably extendable and retractable glass pane racks having a multiplicity of vertically extending glass pane supporting shafts are known. Typically, such glass pane racks are rollably mountable within a rectangular support frame; such support frames typically providing paired roller tracks for receipt of laterally extending wheels or rollers. Commonly, such rectangular frames are fixedly mounted upon the bed of a truck. Such frames may alternately be fixedly mounted upon other above ground level surfaces such as a warehouse storage rack or shelf. Where such rectangular support frames are, for example, installed upon the bed of a truck, rollable motion of the glass rack for cantilevered extension beyond an edge of the truck bed allows a worker to conveniently access the glass rack for loading or off-loading of glass panes.

The instant inventive assembly allows a rollably mounted glass rack such as described above to be safely and conveniently alternately utilized as a glass pane transport pallet. Such additional function is achieved by providing roll stopping means integral with the rectangular support frame; the roll stopping means being adapted to function as a releasable safety operatively engagable with a glass rack transporting cart.

BRIEF SUMMARY OF THE INVENTION

The present inventive glass pane storing and transporting assembly preferably comprises a rectangular base frame adapted for fixed installation upon the bed of a truck. Alternately, the rectangular base frame may be installed upon a warehouse storage rack or storage shelf. Preferably, the base frame comprises a pair of longitudinally extending side beams and a crossbeam, the crossbeam spanning between and rigidly interconnecting the forward ends of the side beams. Preferably, the side beams in combination with the forwardly mounted crossbeam form and define a rearwardly opening glass rack receiving space. Also preferably, the inwardly facing surfaces of the side beams form "C" channel roller tracks within which wheels extending laterally from a base frame of a glass rack are rollably mounted. Such rollable mounting preferably allows such glass rack to alternately move forwardly and rearwardly within the glass rack receiving space. Suitably, the wheels may be rollably mounted upon the inwardly facing surfaces of the side beams, such wheels providing rolling support of roller track surfaces extending longitudinally along the left and right sides of the glass rack.

The open rearward end of the glass rack receiving space allows a glass rack rollably mounted therein to move rearwardly from such space, to disengage from the rectangular base frame, and to separately function as a glass pane transporting pallet. Preferably, an elevationally adjustable or height adjustable rollable cart adapted for carrying the glass rack is utilized, such cart being adapted to facilitate direct transfers of the glass rack from the rectangular base frame.

In order to prevent the glass rack from rollably moving out of the glass rack receiving space of the base frame in the absence of a properly positioned glass rack carrying cart, a roll stop is provided, the roll stop preferably being adapted to allow rearward passage of the glass rack upon rearward positioning and matching elevational adjustment of the glass rack carrying cart.

Accordingly, it is an object of the present invention to provide an assembly having a glass pane carrying rack capable of functioning as an alternately extendable and retractable shelf for convenient loading and off-loading of glass panes safely; and capable of alternately functioning as a separable cart transported glass pane handling pallet.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 1:
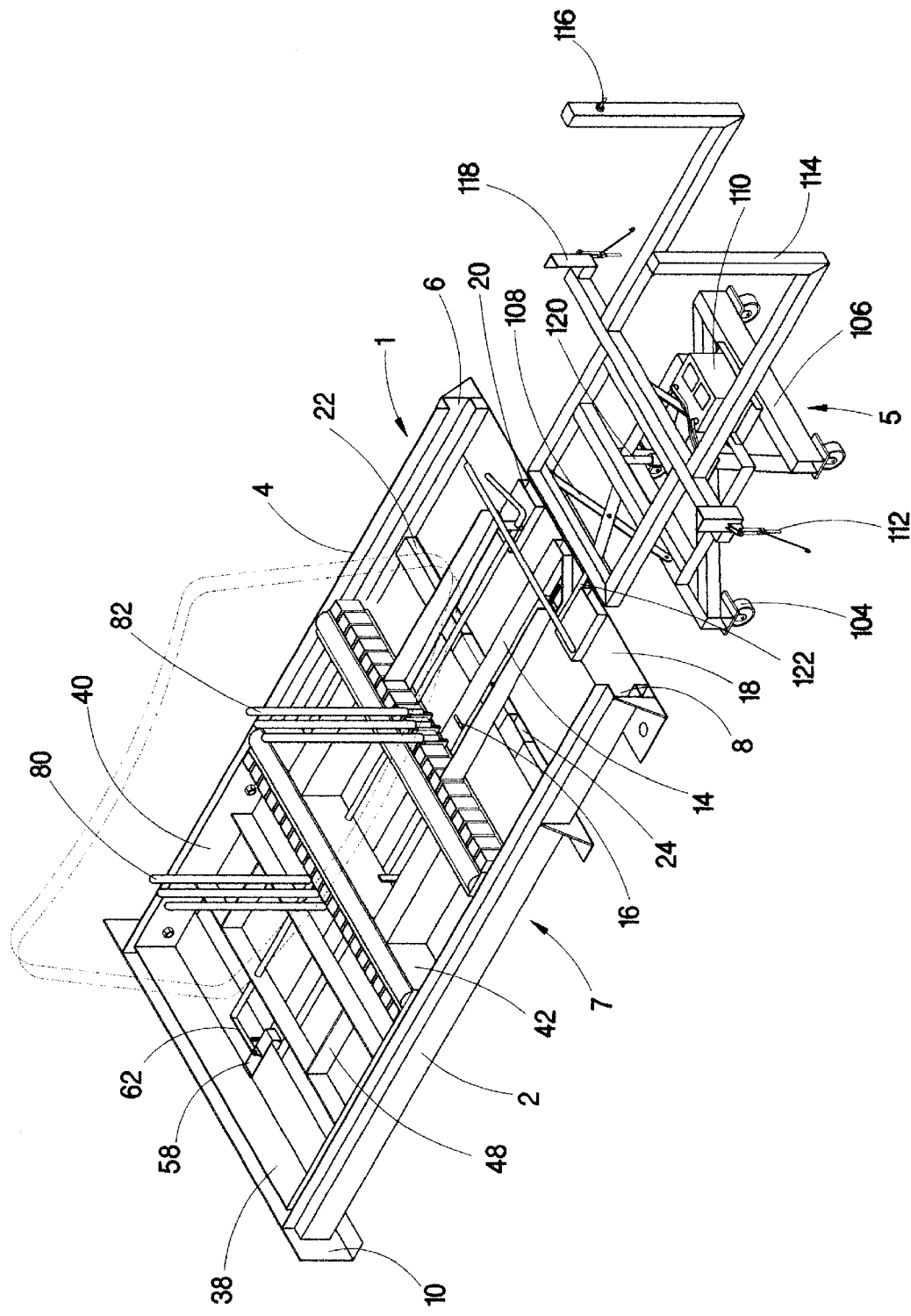
FIG. 1 is an isometric view of the present inventive system.

Referring now to the drawings, and in particular to FIG. 1, the present inventive glass pane handling assembly is referred to generally by arrow and reference numeral 1. A pair of longitudinally extending side beams 2 and 4 form the side walls of a rectangular base frame which is referred to generally by reference arrow and numeral 7. Preferably, the inwardly facing surfaces of the side beams 2 and 4 form "C" channel roller tracks 6 and 8, the floors of such "C" channels providing rolling surfaces. While it is preferred that the inner surfaces of side beams 2 and 4 form roller receiving tracks 6 and 8, such tracks may be suitably eliminated and replaced with a series of rollers (not depicted) positioned for engagement with glass rack mounted roller tracks (not depicted). Such suitable alternate configuration is not preferred because additional wheels or rollers are needed. Preferably, the forward ends of roller tracks 6 and 8 are closed by an "L" beam 10 spanning between and rigidly connecting the forward ends of the side beams 2 and 4; the lower surface of the flange of the "L" beam 10 providing a forward support surface. Preferably, the rearward ends of the roller tracks 6 and 8 are open for outward rolling motion, the side beams 2 and 4, in combination with the "L" beam 10, forming and defining a rearwardly opening glass rack receiving space. Preferably, a flat plate 18 spans between and rigidly connects the lower surfaces of the rearward ends of the side beams 2 and 4, the lower surface of the flat plate 18 providing a rearward support surface. Preferably, an additional crossbeam 22 spans between and is fixedly attached to the lower ends of the side beams 2 and 4, such crossbeam providing additional structural rigidity to the base frame 7. Also preferably, crossbeam 22 and flat plate 18 have forklift tine receiving channels 20 and 24, such channels allowing the entire base frame 7 to be conveniently lifted and transported by a forklift.

Referring further to FIG. 1, as a preferred rack latching means, a latch slot beam 14 having a plurality of latch receiving slots 16 along its upper surface is mounted longitudinally within the base frame 7. Preferably, the lower surface of the forward end of the latch slot beam 14 is fixedly attached to the upper surface of the lower flange of "L" beam 10, while the lower surface of the rearward end of the latch slot beam 14 is fixedly attached to the upper surface of flat plate 18.

Figure 3:
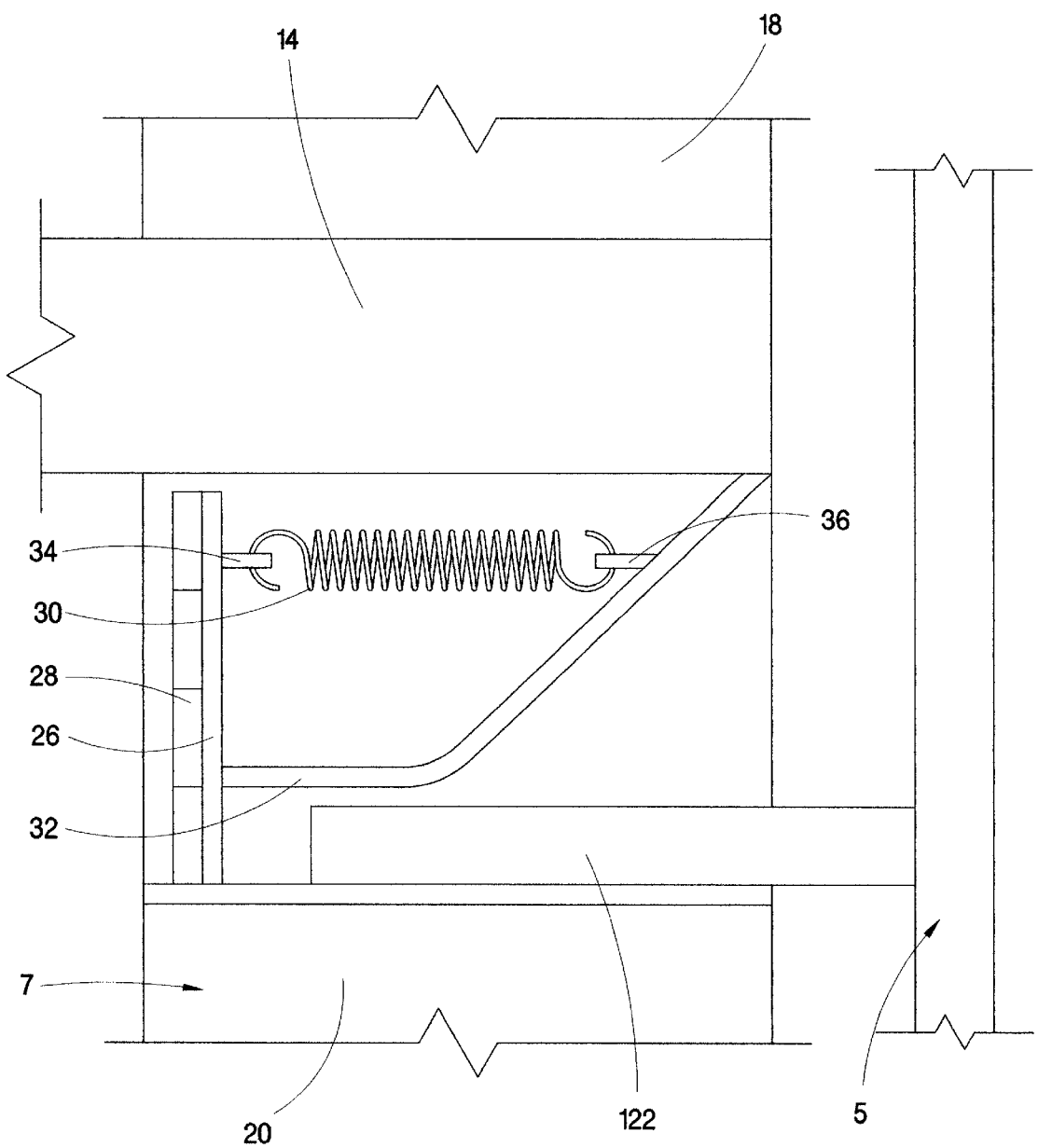
FIG. 3 is a magnified view of a portion of the present inventive system.
Figure 4:
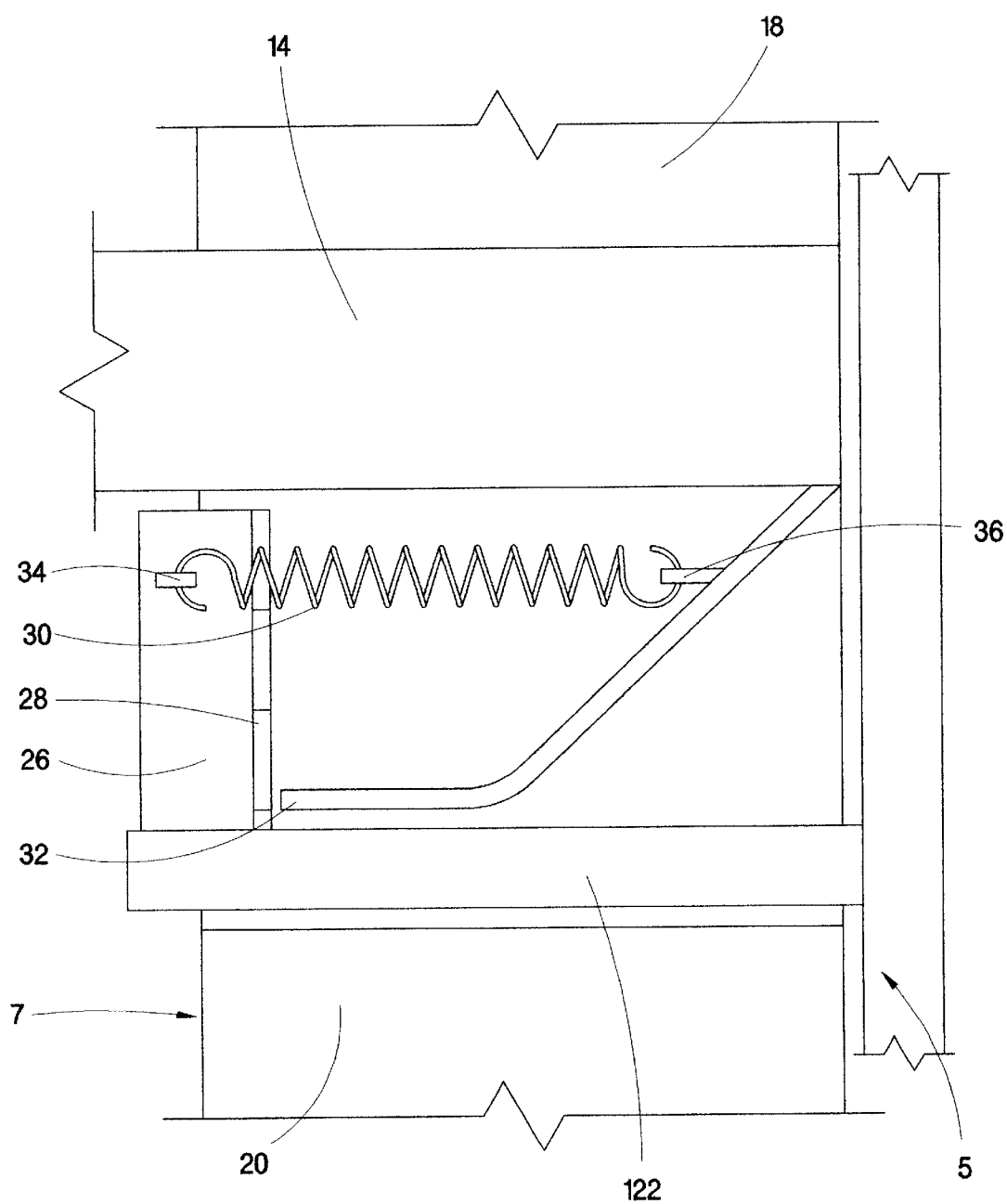
FIG. 4 is an alternate configuration of the mechanism depicted in FIG. 3.

Referring simultaneously to FIGS. 1 and 3, a roll stopping plate 26 is preferably pivotally mounted upon the upper surface of flat plate 18 by a pin and device hinge 28, the rearward face of the roll stopping plate 26 providing a cart engaging surface, and the forward face of the roll stopping plate 26 providing a rack engaging surface, while such plate is in its first vertically oriented position. Referring simultaneously to FIGS. 3 and 4 upon application of forwardly directed pressure upon the cart engaging surface of the roll stopping plate 26, such plate pivots forwardly about pin and device hinge 28 to a second position orientation depicted in FIG. 4 wherein the rack engaging surface of the roll stopping plate 26 faces substantially downwardly. Upon release of such pressure, coiled spring 30 spanning between spring anchors 34 and 36 returns the roll stopping plate 26 to its normally upwardly oriented first position, the forwardly facing end of guide plate 32 stopping the roll stopping plate's rearward pivotal motion.

The roll stopping plate 26 functions as a roll stopping means which may be suitably alternately configured as, for example, a pivotable or movable crossbar (not depicted), or as a pivotable or movable catch lug (not depicted). Similarly, the pin and clevice hinge 28 provides a movable mounting means which may be suitably alternately configured as a flexible leaf hinge (not depicted), an eye and pivot pin hinge (not depicted), a guide track (not depicted) facilitating slidable motion of the stop between first and second positions, or as a trip ridge (not depicted) facilitating free or non-hinged rotational motion of the stop between first and second positions. Also similarly, the coiled spring 30 functions as a biasing means which may be suitably alternately configured as, for example, a leaf spring (not depicted), an elastomeric band (not depicted), a pneumatic spring (not depicted), weighted pendulum (not depicted) normally vertically orienting the stop in the first position, or as a weighted laterally extending lever arm (not extended) normally vertically orienting the stop in the first position.

Figure 2:
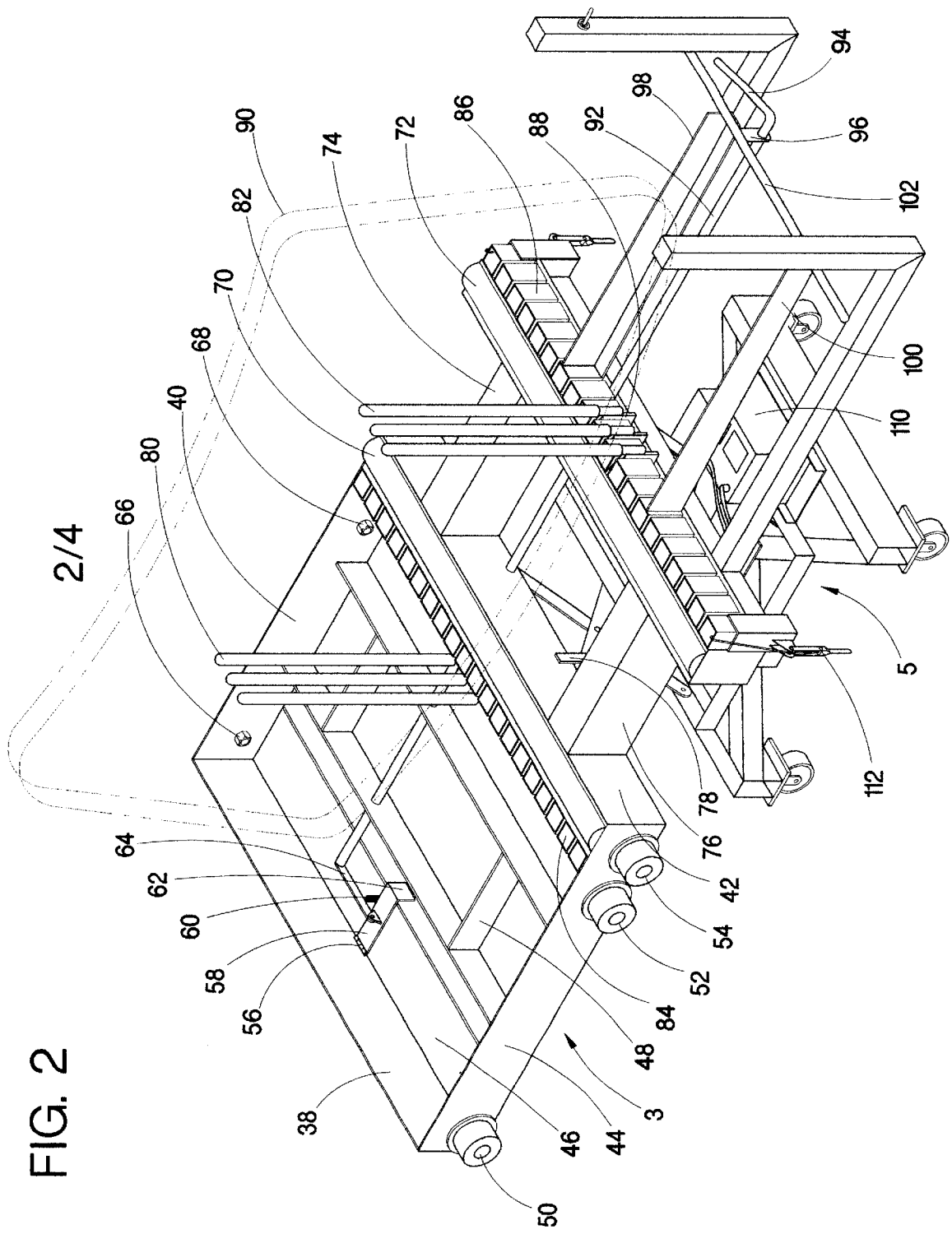
FIG. 2 is an isometric view of the present inventive system in its alternate pallet transport configuration.

Referring simultaneously to FIGS. 1 and 2, the glass rack of the assembly 1 is referred to generally by reference numeral and arrow 3. The glass rack 3 preferably comprises a base frame consisting of longitudinally extending side walls 40 and 44, and laterally extending forward and rear walls 38 and 42, the forward and rear walls 38 and 42 spanning between and rigidly connecting the side walls 40 and 44. Preferably, laterally paired roller bearing wheels 50, 52 and 54 extend laterally outward from side walls 44 and 40, threaded axles of such wheels extending through and being mounted upon such walls by threaded nuts 66 and 68. The paired wheels 50, 52 and 54 are preferably positioned and aligned for rolling engagement with roller tracks 6 and 8. Alternately and suitably, though not preferably, where rollers are mounted upon the inner surfaces of side beams 2 and 4, roller tracks (not depicted) engagable with such rollers may be fixedly attached to side walls 40 and 44. Preferably, structural rigidity of the frame comprising walls 38, 40, 42 and 44 is provided by cross plate 46 and a crossbrace frame 48.

Referring to FIG. 2, a glass pane support and storage structure extends rearwardly and upwardly from the rollable base frame, such structure comprising rearward pivot mounts 84, forward pivot mounts 86, a multiplicity of rear pivotable glass support shafts 80, a multiplicity of forward pivotable glass support shafts 82 and extension beams 74 and 76 rigidly interconnecting rearward and forward cushioned crossbeams 70 and 72. In practice, a multiplicity of the rearward and forward pivotable glass supporting shafts 80 and 82 may be installed across the full width of the rearward and forward pivot mounts 84 and 86; however, for clarity of the view, only three are drawn.

In operation of the glass pane support structure, an operator may laterally approach the structure, and manually downwardly pivot an outermost pair of the glass pane support shafts 80 and 82, allowing a glass pane 90 to be conveniently laterally off-loaded. By reversing such steps, glass panes 90 may be conveniently loaded. Other differently configured glass pane support structures attachable to frame wall members 38, 40, 42 or 44 fall within the scope of the invention.

Referring simultaneously to FIGS. 1 and 2 a pair of handle extension shafts 98 and 100 preferably extend forwardly from the forward pivot mounts 86, such shafts being interconnected by a handlebar 102. Through application of manual pushing or pulling force upon handlebar 102 while the glass rack 3 is rollably mounted within base frame 7, the glass rack 3 may be rollably moved forwardly and rearwardly within the glass rack receiving space of the base frame 7. Preferably, forward and rearward rolling motion of the glass rack 3 is controlled by a spring biased catch plate 62, such plate being engagable with latch receiving slots 16 of the latch slot bar 14. Preferably, the catch plate 62 is pivotally mounted upon the glass rack 3 by means of a pivot arm 58 and hinge 56. In operation of the catch plate 62, clockwise rotational torque applied to handle 94 rotates cylindrical shaft 92 which is rotatably mounted within apertures extending longitudinally through crossbrace frame 48, cushioned crossbeam 70, cushioned crossbeam 72, and mount 96. Referring both to FIGS. 1 and 2, rotational motion of the cylindrical shaft 92 rotates pivot arm 64 clockwise, raising pivot arm 58 and catch plate 62 out of a rearward (as the case may be) latch receiving slot 16. Upon release of such rotational torque applied to handle 94, spring 60 downwardly pulls catch plate 62, allowing such plate to re-engage with a latch receiving slot 16. Preferably, the rearmost latch receiving slot holds the glass rack 3 in a position wherein the rearward face of the forward cushioned crossbeam 70 is substantially co-extensive with the forward edge of flat plate 18.

Referring simultaneously to FIGS. 1, 2 and 3, upon release of catch plate 62 from the rearmost most latch receiving slot 16, the glass rack 3 is freed to rollably move either forwardly or rearwardly. Rearward rolling motion of the glass rack 3 from such rearmost position is preferably controlled by a catch tab 78 which, upon forward motion is engagable with the forward rack engaging surface of, referring to FIG. 3, the roll stopping plate 26. Referring simultaneously to FIGS. 1 and 3, while the roll stopping plate 26 remains in its vertically oriented position, rollable motion of the glass rack 3 out of the glass rack receiving space is prevented. Upon forward pivoting motion of the roll stopping plate 26, rearward rolling motion of the glass rack 3 out of the glass rack receiving space of the base frame 7 is permitted.

Referring further simultaneously to FIGS. 1 and 2, it can be seen that upon actuation of handle 94 to release catch plate 62 from the forward most latch receiving slot 16, and upon rearward rolling motion induced by a manual pulling applied to handlebar 102, the roll stopping plate 26 becomes inaccessible to the operator. Such inaccessibility beneficially prevents damage and injury resulting from accidental rolling of the glass rack 3 out of the glass rack receiving space of the base frame 7, and on to the ground or floor. Such rearward rolling motion of the glass rack 3 out of the glass rack receiving space is appropriate only where an appropriate load bearing vehicle is rearwardly positioned for carrying the glass rack 3 as a glass pane carrying pallet. Referring simultaneously to FIGS. 1 and 2, the glass rack carrying cart, which is referred to generally by reference numeral and arrow 5, represents such an appropriate vehicle.

Referring further simultaneously to FIGS. 1 and 2, the glass rack carrying cart 5 preferably has a base 106 mounted upon wheels 104, the base 106 rollably supporting a scissor leg adjustable glass rack support frame 108. Preferably, elevationally adjustability of the load bearing surfaces of the support frame is provided by an electric motor actuated jack screw 120 powered by an on-board 12 volt battery 110. Preferably, alternate upward and downward actuation of the jack screw 120, and resultant elevational adjustment of the support frame is controlled by a three position electrical switch 116 mounted upon handles 114. Preferably, latch hooks 112 adapted for securely holding the glass rack 3 upon the rollable cart are provided.

Referring simultaneously to FIGS. 1, 3 and 4, a tongue or shaft 122, preferably fixedly attached to and extending forwardly from the forward end of the glass rack carrying cart 5 is provided. Preferably, the shaft 122 serves dual functions of guiding and aligning the glass rack carrying cart through engagement of the forward end of shaft 122 with guide plate 32. As depicted in sequence in FIGS. 3 and 4, roughly aligned rolling motion of the rollable cart 5 toward the guide plate 32 of the rearward end of the base frame 7 causes the shaft 122 of the glass rack carrying cart 5 to be precisely aligned with the base frame 7, and causes the roll stopping plate to pivotally move forwardly to its second position. Such pivotal motion allows overpass of catch tab 78, and allows the glass carrying rack 3 to roll rearwardly onto the load bearing surfaces of the rollable cart 5. While the glass carrying rack 3 is positioned upon the load bearing surfaces of the rollable cart 5, the jack screw 120 is actuated to transfer the full weight of the glass rack 3 from its paired wheels 50, 52, and 54 on to the cart 5. Upon such weight transfer, the glass carrying rack 3 may be rollably moved functioning as a pallet carryable by cart 5 to positions remote from base frame 7. Reverse of the above steps reinstalls the glass carrying rack 3 upon the base frame 7.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An assembly for storing and handling of glass panes, the assembly compromising:
   (a) a first rack support frame mountable upon an above floor level or above ground level surface, the first rack support frame having a left side, a right side, a forward end, and a rearward end; the sides and ends of the first rack support frame defining a rearwardly opening glass rack receiving space;
   (b) a glass rack having a forward end, a rearward end, a right side, and a left side;
   (c) means for rollably mounting the glass rack upon the first rack support frame, said means interconnecting the first rack support frame and the glass rack and allowing alternate forward and rearward motion of the glass rack within the glass rack receiving space;
   (d) a roll stop having a rack engagement surface and a cart engagement surface; and,
   (e) means for movably mounting the roll stop upon the first rack support frame; said means interconnecting the roll stop and first rack support frame and allowing motion between first and second positions, the rack engagement surface of the roll stop facing forwardly while the roll stop occupies its first position; the roll stop moving away from the first position toward the second position upon application of pressure to its cart engagement surface.

2. The assembly of claim 1 wherein the movable mounting means interconnecting the roll stop and the first rack support frame comprises a linkage selected from the group of pin and clevis hinges, flexible leaf hinges, eye and pivot pin hinges, slide tracks, and trip ridges.

3. The assembly of claim 2 further comprising biasing means operatively connected with the roll stop, the biasing means returning the roll stop to its first position upon release of pressure applied to the roll stop's cart engagement surface.

4. The assembly of claim 3 wherein the biasing means is selected from the group of coil springs, leaf springs, elastomeric bands, pneumatic springs, weighted pendulums, and weighted lever arms.

5. The assembly of claim 4 further comprising a plate spanning laterally across a lower surface of the rearward end of the first rack support frame, the interconnection of the roll stop and the frame being positioned upon an upper surface of the plate.

6. The assembly of claim 5 further comprising cart alignment means fixedly attached to the rearward end of the first rack support frame.

7. The assembly of claim 6 wherein the rollable mounting means comprises a plurality of wheels and a plurality of roller tracks, each wheel having an axle; each wheel, in combination with its axle spanning between the first rack support frame and the glass rack.

8. The assembly of claim 7 further comprising a rollable cart having a second rack support frame, the second rack support frame being elevationally adjustable; the rollable cart having a forward end adapted for engagement with the cart alignment means of the first rack support frame.

9. The assembly of claim 8 wherein the adaptation of the forward end of the rollable cart comprises a cantilevered forwardly extending shaft.

10. The assembly of claim 9 wherein the cart alignment means is adapted for guiding a forward end of the cantilevered forwardly extending shaft into contact with the cart engagement surface of the roll stop.

11. The assembly of claim 10 wherein the glass rack comprises a base frame having a plurality of pivotable glass pane supporting rods.

12. The assembly of claim 11 wherein the rollable cart comprises a second base frame underlying the second rack support frame, and a plurality of scissor legs spanning between the second base frame and the second rack support frame.

13. The assembly of claim 7 further comprising a rollable cart having a second rack support frame, the second rack support frame being elevationally adjustable; the rollable cart having a forward end adapted for engagement with the cart engagement surface of the roll stop.

14. The assembly of claim 13 wherein the adaptation of the forward end of the rollable cart comprises a cantilevered forwardly extending shaft.

15. The assembly of claim 14 wherein the cart alignment means of the first rack support frame is adapted for guiding a forward end of the cantilevered forwardly extending shaft.

16. The assembly of claim 15 wherein the glass rack comprises a base frame having a plurality of pivotable glass pane supporting rods.

17. The assembly of claim 16 wherein the rollable cart comprises a second base frame underlying the second rack support frame, and a plurality of scissor legs spanning between the second base frame and the second rack support frame.

* * * * *